United States Patent [19]
Schremp

[11] Patent Number: 5,549,445
[45] Date of Patent: Aug. 27, 1996

[54] MACRO-ENGINEERING PROCESS AND SYSTEM FOR ALL-WEATHER AT-SEA WIND-ENERGY EXTRACTION

[76] Inventor: Edward J. Schremp, 226 S. Fairfax St., Alexandria, Va. 22314

[21] Appl. No.: 786,676

[22] Filed: Nov. 1, 1991

Related U.S. Application Data

[63] Continuation-in-part of Ser. No. 445,591, Dec. 12, 1989, abandoned, which is a continuation of Ser. No. 66,436, Jun. 26, 1987, abandoned.

[51] Int. Cl.⁶ .................................................. F03B 13/12
[52] U.S. Cl. .............................. 415/2.1; 415/3.1; 60/500
[58] Field of Search ............................... 415/2.1, 3.1, 4.1, 415/4.5, 7, 905, 906, 907, 908; 416/227 A, DIG. 8; 417/330; 60/500, 501, 505, 506, 398, 495; 204/129, DIG. 6

[56] References Cited

U.S. PATENT DOCUMENTS

| | | | |
|---|---|---|---|
| 1,446,736 | 2/1923 | Clark | 204/129 |
| 2,390,591 | 12/1945 | Janes | 204/129 |
| 2,433,871 | 1/1948 | Sutherland | 204/129 |
| 3,988,592 | 10/1976 | Porter | 415/7 |
| 4,279,124 | 7/1981 | Schremp | 415/7 |
| 4,495,424 | 1/1985 | Jost | 290/53 |
| 5,037,518 | 8/1991 | Young et al. | 204/129 |

*Primary Examiner*—John T. Kwon
*Attorney, Agent, or Firm*—Jim Zegeer

[57] ABSTRACT

A process and system for harvesting energy from wind action on the high seas ill all weather conditions, on a year-round basis. This process depends upon the use of seagoing platforms (FIG. 2+ FIG. 4) which themselves achieve stability in the presence of storms at sea, doing so through the selective extraction of wave energy. The selective wave energy extraction takes place in such a way that the prevailing ratio of sea height to swell height affecting a typical seagoing platform ((FIG. 2 or FIG. 4)) is reduced to a small fraction of the ratio of sea height to swell height which prevails at a distance from the platform. In short, this process and system stabilizes a plurality of seagoing platforms which support wind and wave energy conversion means, while simultaneously extracting and converting energy from the combined wind and wave action.

18 Claims, 7 Drawing Sheets

MACRO-ENGINEERING PROCESS AND SYSTEM FOR ALL-WEATHER AT-SEA WIND-ENERGY EXTRACTION

This application is a continuation-in-part of U.S. patent application Ser. No. 07/445,591, filed Dec. 12, 1989, now abandoned, which is a continuation of U.S. patent application Ser. No. 07/066,436, filed Jun. 26, 1987, now abandoned, and claims the benefit of the filing dates thereof.

This invention was described in a Disclosure Document filed at the United States Patent and Trademark Office on June 26, 1985. This Document is to be incorporated by reference herein.

Reference is also made to my prior U.S. Pat. No. 4,279,124 which was issued on Jul. 21, 1981.

BACKGROUND OF THE INVENTION

Broadly speaking, the technical field of the present invention is "Wind-Energy Extraction at Sea."

As a renewable source of usable energy which might, in principle, be tapped on an arbitrarily large scale, wind action at sea should obviously far surpass wind action over land. However, in terms of the relative progress made to date in exploiting wind action in these two alternative ways, the present state of the windmill art demonstrates only too clearly that, to all intents and purposes, wind action at sea has not yet been generally found to be technically accessible.

OBJECTS AND SUMMARY OF THE PRESENT INVENTION

The primary object of the present invention is to leach how wind action at sea can actually be freed from this conventional presumption of technical inaccessibility, with the result that, for the first time, wind action can, in fact, be found to possess at sea a vast technical potential as a renewable source of usable energy ready for immediate exploitation on a massive scale and at a competitive cost.

In devising means for and methods of extracting energy in usable form from wind action within any given locality on the high seas, and under whatever conditions might prevail within that locality at any given time, it is always possible to change those weather conditions locally for the better, simply by incorporating with the operation of extracting energy in usable form from wind action at and above the surface of the water within that locality an effective additional operation of simultaneously extracting independently coexisting energy arising from ambient wave action at and below the surface of the water within that same locality.

Thus, the occurrence of adverse effects of stormy conditions at sea can, in this way, be prevented locally to such a degree that the aforementioned conventional presumption of technical inaccessibility need no longer apply to wind action at sea, any more than to wind action over land.

In order, then, to achieve such virtually complete equalization between wind action at sea and wind action over land with respect to their relative degrees of technical accessibility, the essential feature of the just indicated means for and methods of extracting energy in usable form from wind action within any given locality on the high seas must lie in the utilization within that locality of an effective combination of two mutually synergistic operations: a wind energy extracting operation, and a wave energy extracting operation.

While the nature of each of these two mutually synergistic operations may take any one of a practically infinite variety of forms, subject only to the limitation that it fall within the very broad scope of the inventive concept expressed above, it is nevertheless clear that, in any particular instance, the specific nature of each of the two aforesaid operations must ultimately be decided upon through a process of selection from among a possible wide variety of competing options.

DESCRIPTION OF THE PREFERRED EMBODIMENT

Here, for the purposes of illustration, only one such embodiment of the present invention need be discussed in any detail. In this particular embodiment (actually a highly preferred one, for reasons which will presently become evident) the wind energy extracting operation would be performed by the so-called Inverted Eggbeater portion 101 of a vertical-axis wind turbine (or VAWT, for short) whose structural characteristics (excluding certain necessary modifications to be discussed below) are similar to those which are illustrated schematically in FIG. 3.

Figure 1:
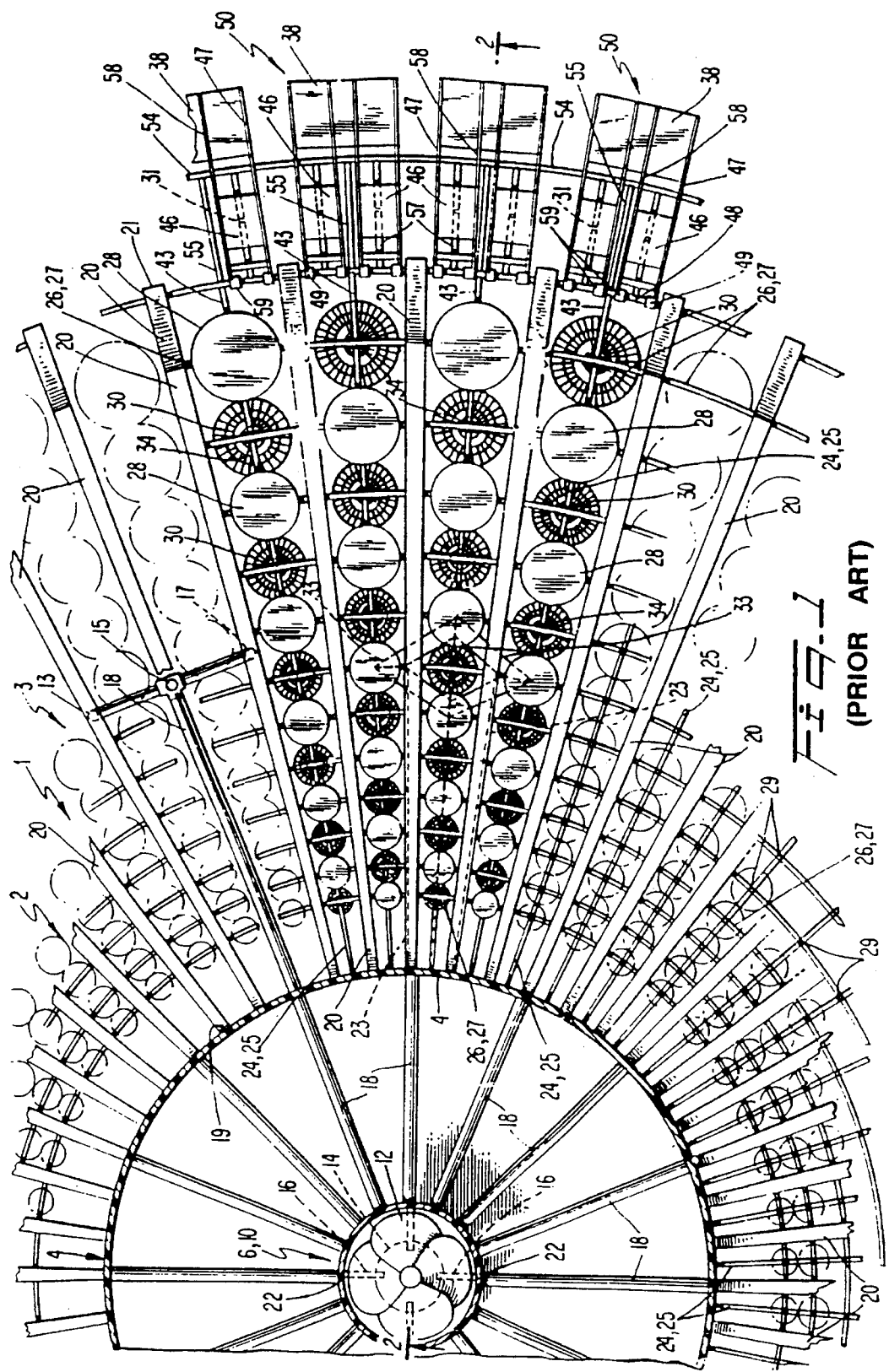
FIG. 1 is a fragmentary plan view schematically showing an overall wave energy extraction system, according to U.S. Pat. No. 4,279,124.
Figure 2:
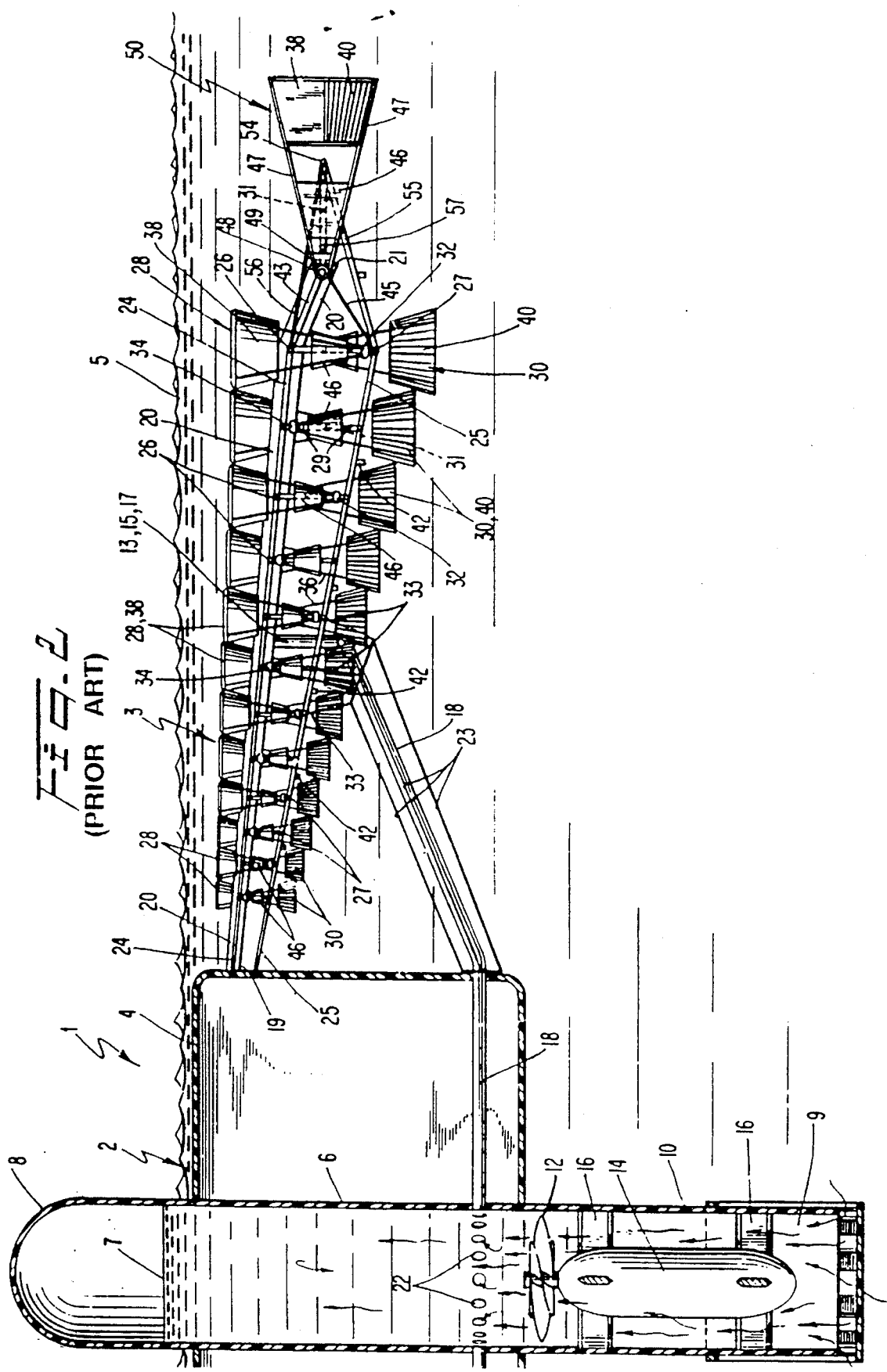
FIG. 2 is a side elevational view of the overall system, taken along the line 2—2 of FIG. 1.

Again, in this particular embodiment, the wave energy extracting operation would be performed by an annular array of submerged wave energy removing impellers 28, 30 and 50 (see cross-referenced FIG. 2) mounted upon an annular outrigger 3 surrounding and secured to an inboard platform 2, the structural characteristics of these components of the presently contemplated overall seagoing wave energy extraction system 1 being similar to those which are illustrated schematically in FIG. 2.

Figure 3:
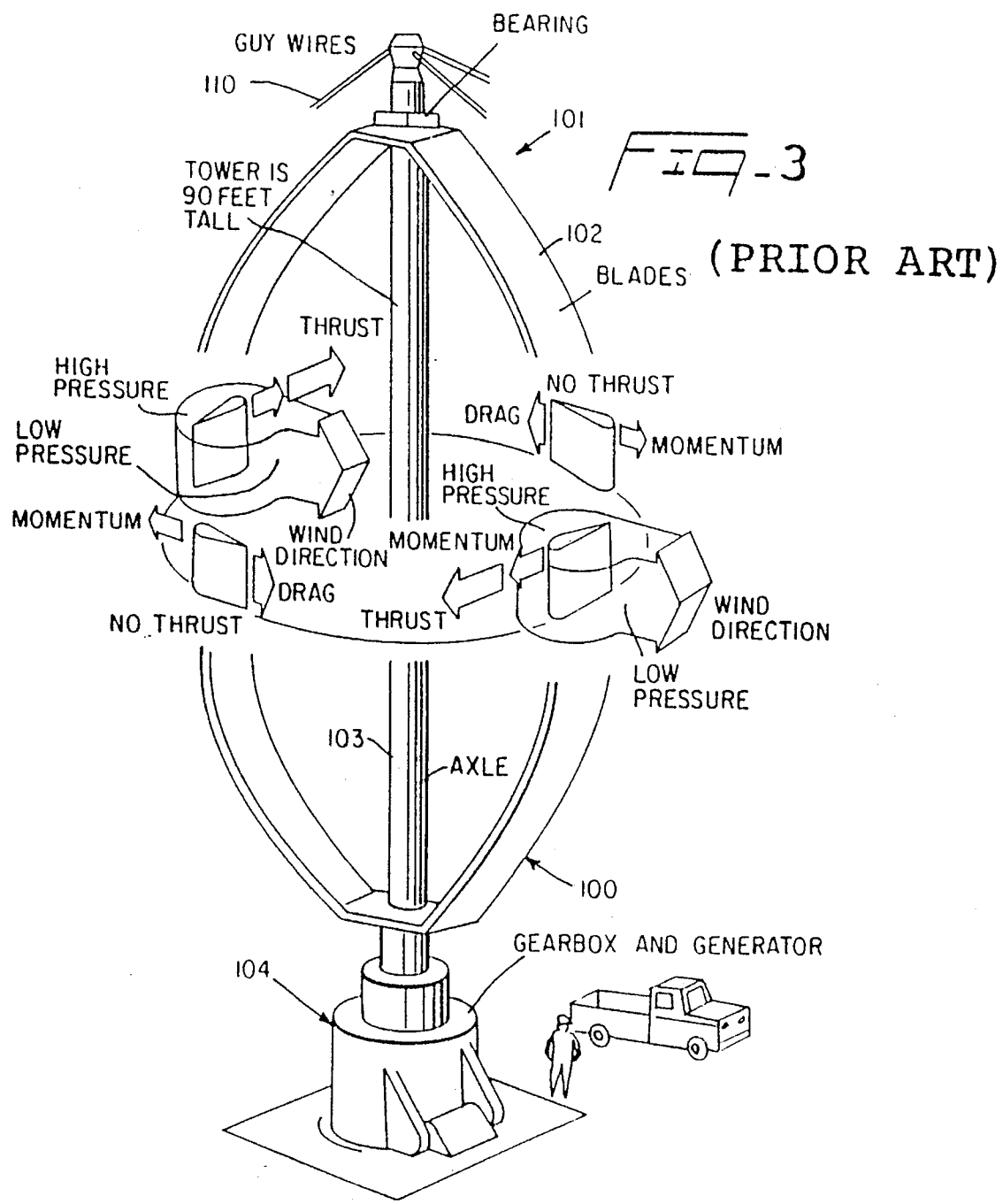
FIG. 3 is an oblique view of a typical land-based vertical-axis wind turbine VAWT according to the prior art.

Upon inspection of these two Figures, it becomes immediately evident that a uniquely effective combination of wind energy and wave energy extracting operations can be achieved by positioning an Inverted Eggbeater 101 similar to that shown in FIG. 3 a suitable distance above an overall wave energy extraction system 1 similar to that shown in FIG. 2, in such a way that the vertical axis of rotation of the Inverted Eggbeater 101 coincides with the vertical axis of rotation of the central turbine 12 illustrated in FIG. 2.

More particularly, it becomes clear that this preferred embodiment of the present invention rids one of the need for the generator and gearbox 104 of the conventional land-based VAWT 100, as well as the need for the massive structure which is required in order to house them; for, whether or not an alternative power transmission mechanism might still be needed elsewhere in place of the gearbox 104, one's customary dependence upon the forgoing three familiar but no longer indispensable features of the land-based VAWT 100 can now be obviated by taking advantage of a feature already in being, so to speak, as an essential component of the overall wave energy extraction system 1 referred to above: namely, the pressure transmission subsystem by means of which extracted wave energy is conveyed from a multiplicity of pumps 46 to the central turbine 12, as is shown in FIG. 2.

Figure 5:
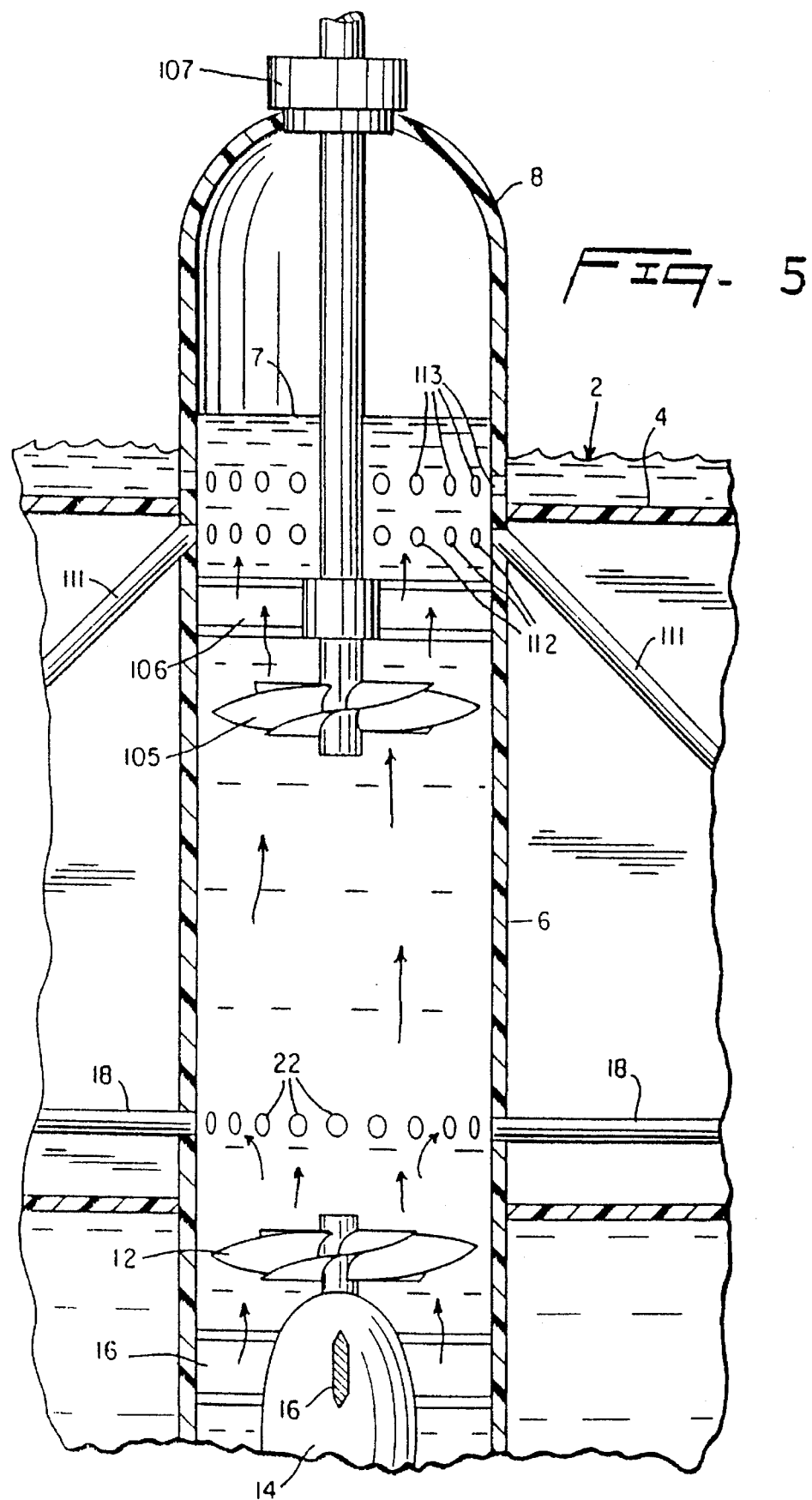
FIG. 5 is an enlarged view of a portion of FIG. 4.

Thus, instead of terminating inside the massive basal structure which houses the generator and gearbox 104 of the conventional land-based VAWT 100, the axle 103 of the Inverted Eggbeater portion 101 of the VAWT can now simply be extended downward through the dome 8 of the interior chamber 6 portrayed in FIG. 2, until, at an appropriate level inside the chamber 6, below the water surface 7 but above the orifices 22 of the various conduits 18, the said axle 103 will come to an end, and (should there be no need, at this point, for an alternative power transmission mechanism) it will there perform the function of imparting its rotational motion to a rigidly attached, propeller-type, low-head runner 105 (see FIG. 5) similar to the runner of the central turbine 12 directly below it, and possessing the same vertical axis of rotation as the latter, although generally differing therefrom in its typical rotational speed, while possibly (if further analysis so dictates) also differing therefrom in its sense of rotation.

As will no doubt have already become apparent by now, this additional runner 105, rather than being used to generate electricity directly, as does the runner of the central turbine 12, would function instead as a wind energy converting pump operating in parallel with each and every wave energy converting pump 46. The manner in which this additional runner 105 would thus function as a pump, and thereby would contribute indirectly but effectively and efficiently to the overall electric power output of the central turbine 12, will presently be discussed in somewhat greater detail. Meanwhile, however, a few remarks should first be made, at this point, about the structural characteristics and wave stabilizing capabilities of this particular embodiment of the present invention.

It will be noted, to begin with, that the aforementioned additional runner 105, like the runner of the central turbine 12, would be mounted centrally within the chamber 6 by means of struts 106 similar to the struts 16. While thus providing support for the additional runner 105, these additional struts 106 would, in turn, be required to provide a major part of the total structural foundation for the Inverted Eggbeater 101, including the axle 103 thereof, as well as any additional power transmission mechanism that might have to be inserted (in contrast to what has been tentatively assumed above) between the said axle 103 and the additional runner 105.

A further contribution to the aforesaid total structural foundation for the Inverted Eggbeater 101 and its associated overall power transmission mechanism would be provided by a hermetically sealed thrust bearing 107 surrounding and supporting the said axle 103 where it passes through the dome 8 of the chamber 6; and a still further such contribution would be provided by exterior struts 108. Each strut is secured at its upper end to a common second thrust bearing 109 surrounding and further supporting the said axle 103 at a point just below the wind energy extracting blades 102 of the Inverted Eggbeater 101, and is secured at its lower end to the top surface of the buoyant, generally doughnut-shaped exterior vessel 4 portrayed in FIG. 2.

Finally, the distal ends of the guy wires 110 indicated in FIG. 3 would be secured, at appropriate peripheral points, to the completely surrounding outboard platform or outrigger 3 shown in FIG. 2.

Now it will be seen from FIG. 3 that the wind energy extracting blades 102 of the Inverted Eggbeater 101 are shaped, in the case of the model chosen for illustration, rather like a regular hexagon, through two of whose opposite vertices the vertically oriented axle 103 of the Inverted Eggbeater 101 passes. Moreover, for such a model, the magnitude of the perimeter of this representative regular hexagon would be, typically, about 200 feet.

In order, then, to support an Inverted Eggbeater 101 of this size in the manner that has just been described above, the aforementioned overall wave energy extraction system 1 must possess certain corresponding attributes, not the least important of which are the corresponding dimensions of the underlying inboard platform 2 and outrigger 3 referred to above. In this particular context, therefore, it would appear necessary that the radius of the supporting overall wave energy extraction system 1, as measured from the vertical axis of rotation of the central turbine 12 to the neutrally buoyant outermost impellers 50 (see FIG. 2), should be no less than 100 feet.

The foregoing two approximate dimensions, e.g., the 200 foot perimeter of the aforesaid representative regular hexagon, and the corresponding 100 foot radius of the overall wave energy extraction system 1, should then provide, for this particular embodiment of the present invention, just about the right basis for achieving both optimal relative size and optimal overall structural strength of the resulting combined wind energy and wave energy extracting subsystems thereof.

But to fulfill these two conditions is, of course, not yet enough to ensure that wind action at sea can actually be freed from (the) conventional presumption of technical inaccessibility, which presumption, as has already been indicated at the outset of this specification, has hitherto constituted, in and of itself, not only the most severe but also the most far-reaching constraint upon current progress in developing a flourishing wind energy industry.

Given, then, the necessary conditions for optimal relative size and for optimal overall structural strength that have just been posited for the aforesaid combination of wind energy and wave energy extracting subsystems, what is still required is that the latter subsystem 1 possess a wave stabilizing capability that will provide for tile former subsystem 101 a degree of shelter from the surrounding high seas sufficient to enable effective wind energy extraction to take place in the presence of any surrounding sea state within the usual range of sea states found, for example, off the Atlantic or Pacific coast of the United States.

It is, of course, well known that the usual range of sea states is found, in many instances, to vary appreciably from place to place on the high seas, as in fact it does between the Atlantic and Pacific coasts of the United States. Consider, therefore, how the wave stabilizing capability of the foregoing particular embodiment of the present invention could be specially adapted to limited use, say, off the North Atlantic coast of the United States, where the average waves have heights between 5 and 15 feet, and wavelengths between 100 and 300 feet.

In this specific case, the wave energy extracting subsystem 1 in question (shown schematically in FIG. 2) should include, around its entire periphery, that full complement of neutrally buoyant outermost impellers 50 which would be capable of coping with ambient progressive sinusoidal surface waves traveling in arbitrary directions, and having wave heights of up to 15 feet and wavelengths of about 300 feet.

Here the phrase "capable of coping" is intended to mean "capable of performing resonant oscillatory motions (of maximal acceptable limiting amplitude that is characteristic of the generally concentric ring of impellers 28, 30, or 50 in question) in tuned omnidirectional response to the corresponding ambient progressive sinusoidal surface waves," it being further required that, within the generally concentric ring of impellers 28, 30, or 50 in question, the wave heights of the said corresponding ambient progressive sinusoidal surface waves are thereby reduced, through wave energy absorption by the said impellers 28, 30, or 50, to such a degree that effective wind energy extraction can simultaneously take place within the central region circumscribed and sheltered by impellers 28, 30, or 50.

Next in the order of inward progression from its periphery, this wave energy extracting subsystem 1 should include an outermost pair of generally concentric rings of nonbuoyant impellers 30 which would be capable of coping, as described above, with ambient progressive sinusoidal surface waves traveling in arbitrary directions, and having wave heights of up to 15 feet and wavelengths of about 250 and 200 feet, respectively.

Above these nonbuoyant impellers 30 and in the same order of inward progression, the wave energy extracting subsystem 1 should include an outermost pair of generally concentric rings of homologous buoyant impellers 28 which would be capable of coping, as described above, with ambient progressive sinusoidal surface waves traveling in arbitrary directions, and having wave heights of up to 15 feet and wavelengths of about 150 and 100 feet, respectively.

Next, the wave energy extracting subsystem 1 should include an inner pair of generally concentric rings of non-buoyant impellers 30 which would be capable of coping, as described above, with ambient progressive sinusoidal surface waves traveling in arbitrary directions, and having wave heights of up to 15 feet and wavelengths of about 75 and 50 feet, respectively.

Finally, the wave energy extracting subsystem 1 should include an innermost series of generally concentric rings of buoyant impellers 28 which would be capable of coping, as described above, with ambient progressive sinusoidal surface waves traveling in arbitrary directions, and having wave heights of up to 15 feet and wavelengths of about 40, 30, 20, and 10 feet, respectively.

As prescribed above, the entire annular array of impellers 28, 30, and 50 may be viewed as comprising two distinct parts: (i) an outer partial annular array including impellers 28, 30, and 50 which respond resonantly to waves of approximate wavelength 100, 150, 200, 250, and 300 feet, respectively; and (ii) an inner partial annular array including impellers 28 and 30 which respond resonantly to waves of approximate wavelength 10, 20, 30, 40, 50, and 75 feet, respectively.

A special purpose of the outer part (i) of the aforesaid entire annular array of impellers 28, 30, and 50 is to cope, as described above, in an optimal fashion with the totality of "average waves" as defined above for the present specific case, and to do so by exploiting as fully as possible the individual resonance characteristics of all of its component impellers 28, 30, and 50 as a means of maximally amplifying the corresponding aggregate wave power incident upon every such component impeller, and thereby of achieving, overall, a very broad-band range of amplified response extending continuously throughout, and even somewhat beyond, the range of wave heights and wavelengths which characterize the aforesaid "average waves." Here, incidentally, any or all of the five above prescribed approximate wavelengths at which resonance occurs may be altered to some extent without affecting appreciably the aforesaid optimal overall performance of the outer part (i) of the entire annular array of impellers 28, 30, and 50.

While this outer partial array of impellers (i) will always extract at least a substantial fraction of the total incident wave energy content of the "average waves" as defined above, there will, nevertheless, almost always be present an accompanying but completely different component of the prevailing sea state whose incident wave energy content can be extracted only by the inner partial array of impellers (ii). An important distinction must therefore be drawn between the respective special functions of the outer part (i) and the inner part (ii) of the foregoing entire annular array of impellers 28, 30, and 50; and what that distinction is can perhaps best be clarified by considering, along the following lines, how varied over time the surrounding sea state can be.

Thus, it is only very occasionally that these widely varying sea states will assume the unmixed form, known as "swell," which is characterized by high, long waves that have already traveled, by distances that are sometimes immense, away from the area where they were originally wind-generated. As the distance from the generating area increases, this "swell" approximates more and more closely to the ideal form that has already been identified above as a progressive sinusoidal surface wave traveling in an arbitrary direction at a certain speed, and having a certain wave height and wavelength, and that is accordingly suited to a mathematical analysis of, for example, the overall response characteristics of the outer part (i) of the foregoing entire annular array of impellers.

If, on the other hand, as is much more often the case, the entire annular array of impellers 28, 30, and 50 happens to be located in or near any region where waves are in the immediate process of being wind-generated, that entire annular array will then be surrounded by a far more complex sea state known simply as "sea" in general, but more particularly as "storm sea" when the generating winds are of unusually high velocity and/or unusually long duration. The resulting extremely complex pattern of the surrounding sea surface can then be adequately described only in terms of a spectrum that includes progressive sinusoidal wave trains of a great variety of wave heights and wavelengths, moving in various directions.

Still more likely to occur than either of the two previous limiting cases is one in which the sea state surrounding the entire annular array of impellers 28, 30, and 50 at any particular time will be some combination of "swell" and "sea"; and in every such instance the then current spectrum describing this overall sea state will now be composed of two essentially independent partial spectra: a "swell" sub-spectrum, most of whose incident wave energy content, being concentrated within a band of wavelengths ranging between 100 and 300 feet, is subject to extraction primarily by the outer partial area of impellers (i), in the manner described above; and a sea subspectrum, most of whose incident wave energy content, being concentrated within a band of wavelengths ranging between 10 and 75 feet, is subject to extraction primarily by the inner partial array of impellers (ii), in a precisely similar manner.

Now this distinction between "swell" and "sea" subspectra is crucially important from the point of view of providing the foregoing particular embodiment of the present invention with a wave stabilizing capability adequate to the requirement set forth above: namely, that the wave energy extracting subsystem 1 of that embodiment shall be capable of providing for the wind energy extracting subsystem 101 thereof a degree of shelter from the surrounding high seas sufficient to enable effective wind energy extraction to take place in the presence of any surrounding sea state within the usual range of sea states.

Here it should be pointed out that, in the interest of simplicity, the foregoing requirement, as set forth earlier herein, has been stated only in terms of enabling effective wind energy extraction to take place in the presence of potentially unfavorable ambient wave action, without addressing, for the time being, the analogous problem that arises in the presence of potentially unfavorable ambient wind action. This latter problem, which of course applies equally to wind action at sea and to wind action over land, will nevertheless be dealt with briefly below.

As for the former problem, the first necessary step towards its solution would be to call to mind that within the usual range of sea states, contemplated above, those sea states which involve any appreciable component of "sea" are of extremely common occurrence, while those which involve a "storm sea" component also occur, though only infrequently, and then usually at low or moderate levels of intensity. The next such step would then be to observe that the corresponding overall "sea" subspectrum, unlike the associated "swell" subspectrum, can be potentially unfavorable to effective wind energy extraction, and must therefore be moderated at least to a degree sufficient to enable effective wind energy extraction to take place.

The resulting moderating action upon the aforesaid overall "sea" subspectrum, effected through extraction of a substantial portion of its incident wave energy content by the inner partial array of impellers (ii), will then bring face to face with the inboard platform 2, and thereby with the aforementioned Inverted Eggbeater 101 which it supports, nothing worse than an immediately surrounding filtered sea state, free for the most part from the characteristic steepness, roughness, and violence of "sea," and having a gradualness, smoothness, and regularity that approximate the qualities of "swell" and thereby permit easy riding among the remaining, relatively longer wavelength waves.

Indeed, it is right here that, for the first time, the central inventive idea emerges as to precisely how the occurrence of adverse effects of stormy conditions at sea can, as is asserted above, be prevented locally to such a degree that the aforementioned conventional presumption of technical inaccessibility need no longer apply to wind action at sea, any more than to wind action over land.

Furthermore, it is right here that, for the first time, a valid basis simultaneously emerges for bringing decisively to an end any and all remaining doubts that devices of the kind described in FIG. 2, when designed, for example, for the purpose of commercially harvesting the energy of ocean waves on a far vaster scale than is contemplated here, can have the capability not only of converting wave energy with high efficiency in the presence of average sea states, but also of continuing to do so even in the stormiest of seas.

While such larger devices as those which have just been mentioned above would normally be designed to have a rated power output of about 50 megawatts, it would, on the other hand, be preferable for the rated power output of the foregoing particular embodiment of the present invention to be set, more or less arbitrarily, at about 5 megawatts in the aggregate, of which about 2 megawatts might be attributable to wind action alone, and the remaining 3 megawatts to wave action alone.

By adopting this latter choice, for example, it would be quite feasible technically, and quite advantageous economically, to exploit such 5 megawatt combined wind-wave energy converters by deploying them in clusters, each comprising perhaps 100 of these smaller devices, anywhere on the high seas that might be deemed commercially most profitable, and in such a manner that they, too, like the just mentioned 50 megawatt wave energy converters, would have the capability not only of converting wave energy with high efficiency in the presence of average sea states, but also of continuing to do so even in the stormiest of seas.

Indeed, every such cluster would itself acquire this twofold capability if, for example, whenever it might experience or anticipate approaching storm conditions of extraordinary violence, a corresponding dedicated group of perhaps four of the aforesaid 50 megawatt wave energy converters were to proceed from their usual site of operations to the vicinity of the said cluster, understanding, instructions that they so maneuver with respect to its position as to provide it with the greatest possible degree of shelter from "storm sea."

Now the said cluster, when located in the deep waters of the open ocean, in the presence of a rising "storm sea," will be surrounded by waves whose height, speed, and wavelength will ultimately be limited only by the velocity of the wind. However, even in the very infrequent case of a great storm of long continuance, the waves finally formed under these conditions will be surprisingly, less steep than those in a moderate gale; for, whereas the final heights of these waves will be directly proportional to the steadily prevailing wind speed, their final wavelengths will be proportional to the square of the latter, so that the steepness of the final waves will diminish in inverse proportion to the violence of the storm, as indicated on the Beaufort scale of wind speed.

If, then, throughout such a storm of rare violence and duration, the aforesaid four 50 megawatt waveconverters were to be suitably deployed on the windward side of the said cluster, the resulting moderating action upon the "storm sea" would, in effect, bring face to face with each of that cluster's 100 individual Inverted Eggbeaters 101 nothing worse than an immediately surrounding, filtered sea state, having a gradualness, smoothness, and regularity that approximate the qualities of "swell" and thereby permit easy riding among the remaining, relatively longer wavelength waves.

While the foregoing moderating action upon the a storm sea" will have thus been effected through extraction of a portion of its total incident wave energy content by the combined overall arrays of all impellers 28, 30, and 50, not only of the four 50 megawatt waveconverters, but also of the 100 smaller wind-waveconverters which comprise the said cluster itself, what is crucially important in the present context is not the quantity, but rather the quality, of wave energy which will have thus been extracted.

Figures 4, 4A:
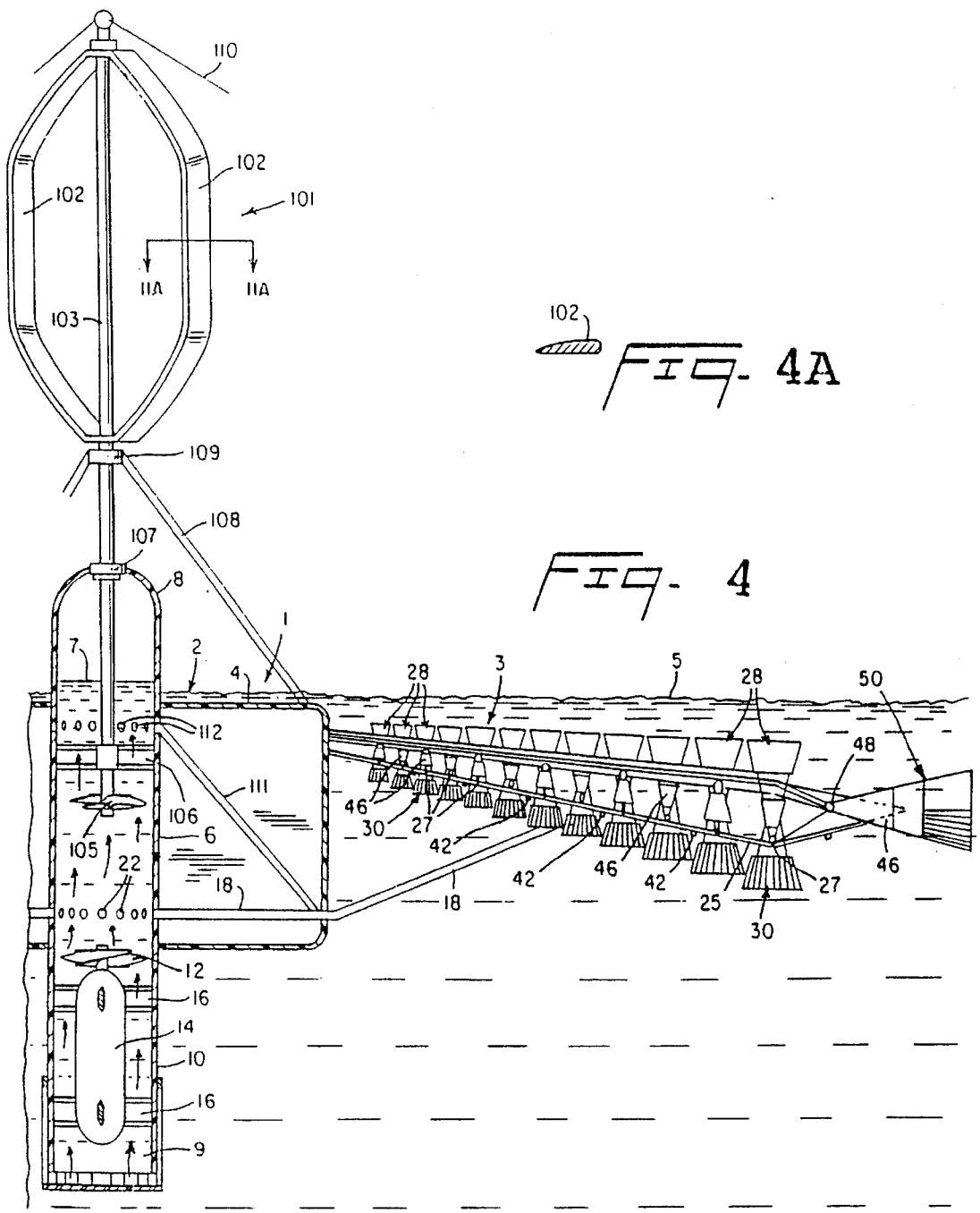
FIG. 4 is a side elevational view of a typical overall sea-based VAWT according to the present invention.
FIG. 4a is a view along the lines 4A—4A of FIG. 4.
Figure 6:
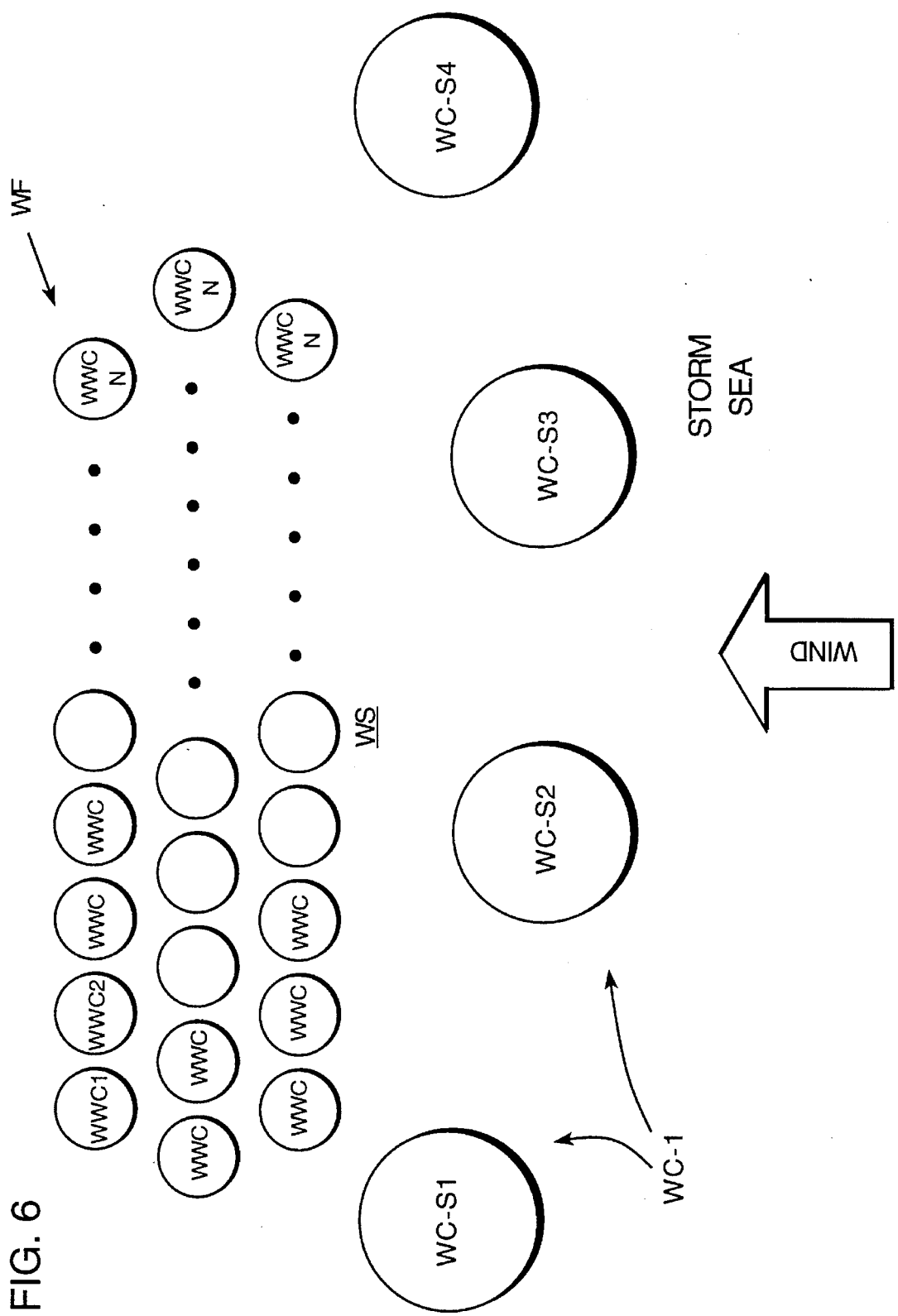
FIG. 6 illustrates (i) a plurality of wind-wave converters constituting a sea-based windfarm in a predetermined area of the sea; and (ii) a lesser number of high power wave converters being maneuvered generally around the windward side thereof.

FIG. 6 illustrates a plurality of wind-waveconverters WWC-1, WWC-2, WWC-3 . . . WWC-N constituting a sea based wind farm WF, each wind-wave converter comprising a wind energy removing means and a wave energy removing means as shown in FIG. 4. A group of, for example, four approximately 50 megawatt waveconverters, WC-S1, WC- S2, WC-S3 and WC-S4, is illustrated as having proceeded from its usual site of operations (not shown) in order to maneuver around the windward side WS of windfarm WF to such positions as to provide wind farm WF with the greatest possible degree of shelter from a "storm sea" as described earlier herein.

Thus, in this very rare context, and yet in very close analogy with the corresponding usual treatment, indicated above, of "average waves" as previously defined for the present specific case, the partial spectrum of the "storm sea" component, (which now, in fact, would be practically the totality) of the overall surrounding sea state may now be regarded as comprising, in its turn, two essentially independent partial subspectra: (i) a relatively long wavelength, "swell-generating" subspectrum, whose tremendous incident wave energy content, being distributed over a very broad band of long wavelengths ranging from 600 to 2,000 feet or more, is subject to no appreciable extraction by the aforesaid combined overall arrays of all impellers 28, 30, and 50 except at the relatively, shorter wavelengths within this long wavelength band; and (ii) a relatively short wavelength "sea" subspectrum, whose relatively smaller, but still considerable, incident wave energy content, being concentrated within a band of wavelengths ranging from 10 to 600 feet, is subject, as described earlier, to maximal acceptable extraction by the aforesaid combined overall arrays of all impellers 28, 30, and 50.

Accordingly, it is almost entirely the just defined "sea" subspectrum (ii), and hardly at all the just defined "swell-generating" subspectrum (i), which would undergo, as above, the substantial degree of attenuation necessary in order that the said cluster's 100 individual Inverted Eggbeaters 101 might become sufficiently free from the characteristic steepness, roughness, and violence of the surrounding unfiltered "sea" subspectrum (ii to enable them, in turn, to "ride easily" under the virtually exclusive, far gentler influence of the more immediately surrounding filtered "swell-generating" subspectrum (i).

However, for the said cluster's 100 individual Inverted Eggbeaters 101 to be thus enabled to "ride easily" in the stormiest of seas is, of course, only the first necessary step towards a complete solution to the earlier stated twofold problem that arises in the combined presence of potentially unfavorable ambient wave and wind action. Indeed, as was pointed out; earlier, the second of these two problems (which has not yet been, but will now be addressed) applies equally to wind action at sea and to wind action over lands, and the question as to whether or not there might exist a solution to the latter problem still remains an unanswered question which applies equally to wind action at sea and to wind action over land. Even so, when compared under equally adverse weather conditions involving ambient winds of equal speed and duration, the options that are available for coping with potentially damaging wind action are distinctly better at sea than over land.

If, in contrast with the aforesaid seagoing cluster of 100 individual Inverted Eggbeaters 101, one were to consider, for example, a windfarm on land comprising 100 wind energy generators of any type but of comparable dimensions, one would first of all have to note that a certain type of incomparability must necessarily subsist between the sea-based windfarm and the land-based windfarm, arising from the extremely wide divergence between their respective overall rated power outputs. For, whereas the overall rated power output of the presently contemplated sea-based windfarm would be about 500 megawatts, that of the land-based windfarm would probably be no more than about 20 megawatts.

This divergence between the respective rated power outputs of the aforesaid sea-based and land-based windfarms would result, in the first place, from the fact that 300 of the 500 megawatts of overall rated power output of the sea-based windfarm would be attributable to wave action, and in the second place, from the fact that the remaining 200 of the said 500 megawatts would reflect an inherent difference in performance characteristics between the individual sea-based Inverted Eggbeaters 101 and the individual land-based wind energy generators. This latter difference is tantamount, in fact, to a tenfold advantage of the former over the latter, due primarily to the circumstance that, over land, the most favorable wind fields are at high altitudes and consequently for the most part technically inaccessible, whereas, at sea, the most favorable wind fields extend all the way down to the ocean surface itself.

Despite this extreme divergence between their respective overall rated power outputs, the aforesaid sea-based and land-based windfarms may nevertheless be further compared with one another to good purpose; and, to this end, one might therefore consider the possibility of integrating both windfarms, as electricity producing systems, with the transmission and distribution system of a major electric utility located at approximately the same distance, say 100 miles, from each windfarm.

At this point, it should perhaps be remarked that, for the electric utility companies located anywhere along the Atlantic and Pacific coasts of the United States and Canada, the use of modular 500-megawatt sea-based windfarms, in the manner that is here under discussion, could provide an entirely new way in which to respond to future growth in the demand for electricity, a way which, more than any other, would tend to reduce the unit cost of electricity.

Furthermore, unlike any electricity producing system yet in the offing, the presently contemplated 500-megawatt sea-based windfarm typifies what would become the modular "building block" of a brand-new commercial electric generating technology whose scale and cost effectiveness could increase almost indefinitely in response to increasing growth in the demand for electricity, without encountering environmental constraints (such as those which coal power and nuclear power entail), or constraints due to depletion (as with oil and gas resources), or constraints of a geographical nature (as with OTEC at sea and with land-based wind energy systems).

Just as there are ways of obtaining a larger fractional coverage of electricity demand by wind energy alone, whether through storage facilities or through enlarged surplus capacity, so, too, can one obtain a still larger fractional coverage by wind and wave energy combined. In the latter case, in fact, there exist fresh options that are simply not available in the former case, and that would afford corresponding new opportunities to reduce even further the unit cost of electricity.

Thus, in the former case, a typical example might involve 100 wind energy generators of fixed frequency, each of which would start at a wind speed of about 11 miles per hour and would cut out at a wind speed of about 33 miles per hour, at which point it would have reached its rated power output of, say, 200 kilowatts. At wind speeds below 11 miles per hour and above 33 miles per hour, all 100 wind energy generators would accordingly be at a standstill.

In the latter case, on the other hand, each of the 100 component Inverted Eggbeaters 101 of the aforesaid 500-megawatt sea-based windfarm would be set free from any upper or lower limit of ambient wind speed of the kind that would necessarily be imposed, were it to be directly connected, as in the former case, to an electric generator of fixed frequency and of a given maximum power rating.

In fact, a preliminary description has been given above of the manner in which every such Inverted Eggbeater 101 would be supported on its particular inboard platform 2 so as to be best fitted for the far more satisfactory, alternative purpose of driving a corresponding wind energy converting pump, in the form of a second runner 105 (additional to, but mechanically isolated from, the runner of the central turbine 12) that would operate in parallel with a co-located multiplicity of wave energy converting pumps 46.

Clearly, by thus arranging in parallel the aforesaid respective sources of wind power and wave power, and indeed by further arranging in parallel the respective sources of power associated with waves of different wavelength, as has been proposed in U.S. Pat. No. 4,279,124, one may avail Oneself of a practically limitless variety of ways of reducing the fluctuations in overall power output of any sea-based windfarm such as the presently contemplated one with a 500-megawatt rating.

As a matter of fact, in light of the immediately foregoing considerations, it is essentially meaningless to speak of the separate power ratings of the wind energy and wave energy extracting subsystems of any particular embodiment of the present invention, concerning which it has previously been stated that about 2 megawatts might be attributable to wind action alone, and the remaining 3 megawatts to wave action alone.

For consider what meaning, if any, might be attached, for example, to the separate power rating of that full complement of neutrally buoyant outermost impellers 50 which are discussed above, and are there characterized as responding resonantly to waves or wavelength about 300 feet. To be sure, in the presence of a single progressive sinusoidal wave train of wavelength 300 feet, such a full complement of impellers 50, if totally submerged to a minimal depth below the ocean surface, would already be separately subject (when in deep water) to a total incident wave power of about 4 megawatts if the wave height were 5 feet, of about 16 megawatts if the wave height were 10 feet, of somewhat less than 36 megawatts if the wave height were 15 feet, an so on until at some critical wave height that is not determinable by conventional first-order theory, a maximum total incident wave power would ultimately be reached.

From an inspection of FIG. 2, it will be seen that, under normal operating conditions, every impeller 50 is totally submerged to a predetermined depth below the ocean surface which is substantially greater than its corresponding "minimal depth" of total submergence. Here, it should be further pointed out that, as has been generally proposed in U.S. Pat. No. 4,279,124, the particular embodiment of the present invention-now under discussion would likewise be capable of varying its depth of submergence, in the present case over a range of perhaps 30 to 40 feet.

On the other hand, the same full complement of impellers 50, if totally submerged in deep water to a depth of about 33 feet below the ocean surface, would be subject to a total incident wave power of just about 1 megawatt if the surface wave height were 5 feet, of about 4 megawatts if the surface wave height were 10 feet, and of somewhat less than 9 megawatts if the surface wave height were 15 feet. And, at intermediate depths, each of the corresponding three total incident wave powers would then be an exponentially decreasing function of depth.

Thus, what has just been described in terms of that full complement of neutrally buoyant outermost impellers 50 is but one of the many instances of an entirely new kind of flexibility with which the aforesaid 500-megawatt sea-based windfarm can be endowed, but the aforesaid 20-megawatt land-based windfarm obviously cannot; namely, a flexibility in adjusting the separate power ratings of various subsets of differently resonating impellers, as defined above, in such a way as to minimize overall output power fluctuations in the presence of any one of an extremely wide variety of combinations of ambient wave and wind action. Moreover, as has just been seen, this flexibility will have been made possible simply by providing each of the 100 individual 5-megawatt seagoing wind-waveconverters comprising the aforesaid 500-megawatt sea-based windfarm with an appropriate capability of varying its depth of submergence, as discussed earlier.

Among the aforesaid combinations of ambient wave and wind action, there are two ranges of such combinations that deserve special attention here: a low-wind range, which would involve wind speeds (in the presence of any ambient sea state) so low that every component Inverted Eggbeater 101 of the aforesaid 500-megawatt sea-based windfarm would be at a standstill; and a high-wind range, which would involve wind speeds (again, in the presence of any ambient sea state) so high that a complete cutout of every such component Inverted Eggbeater 101 would be required.

Of course, as has already been indicated above, for each of the aforesaid component Inverted Eggbeaters 101, the critical wind speed below which, standstill will take place would be lower, and the critical wind speed above which complete cutout will be necessary would be far higher, than for any land-based wind energy generator of comparable dimensions. Moreover, when further compared with any such land-based wind energy generator which might be located in a nearby coastal area (i.e., an area extending approximately 30 miles inland from a well defined coastline), every such Inverted Eggbeater 101 would demonstrate, throughout its far greater range of operational wind speeds, that its location at sea is, in fact, far superior to the nearby land-bound location of the latter with respect to the wind speeds that simultaneously prevail at the two different sites.

Figure 7:
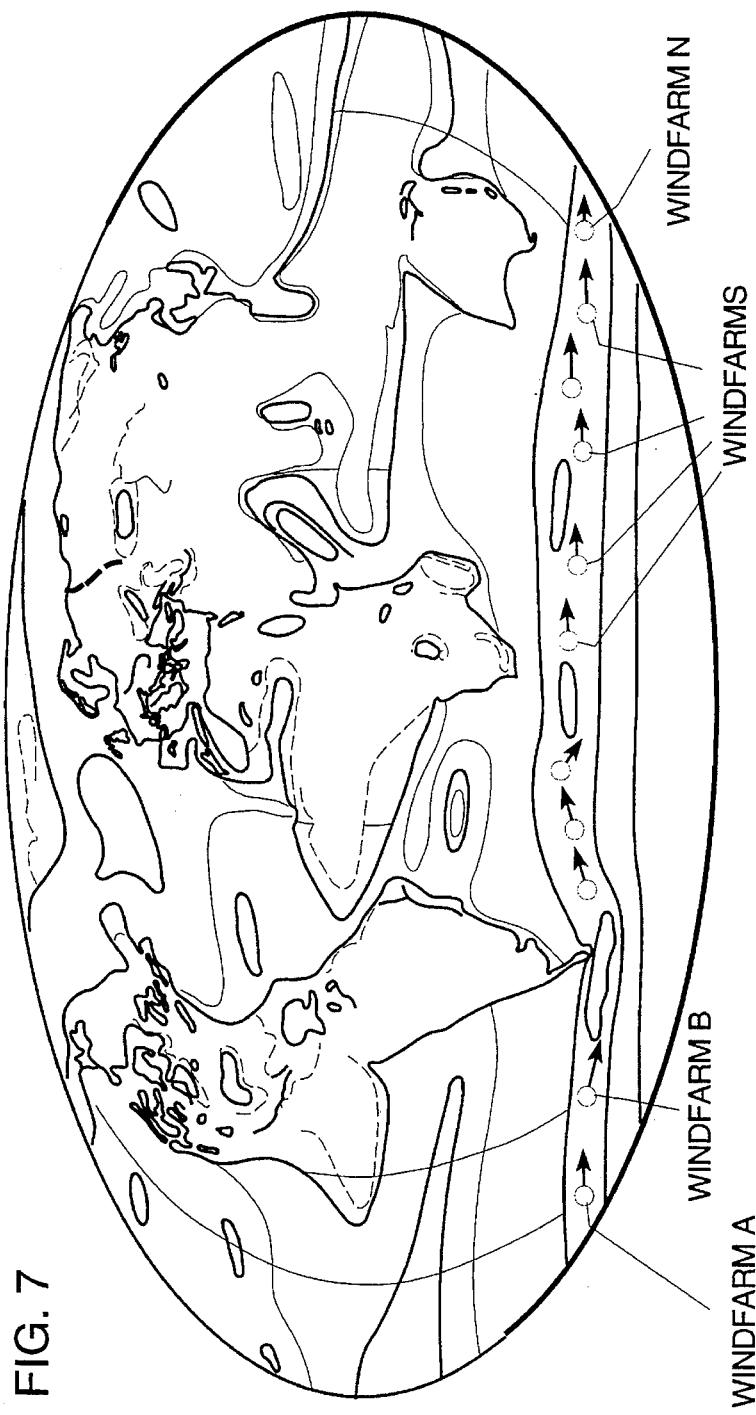
FIG. 7 is a worldwide energy distribution map by Battelle Pacific Northwest Laboratory showing the broad seaway that completely encircles the earth at southern latitudes.

Indeed, most remarkable of all is what one can accomplish, on a truly grand scale, through the use of the aforesaid 500-megawatt sea-based windfarms in the following unprecedentedly favorable market niche situation. In FIG. 7 there is shown a reduced scale reproduction of a wall-sized global map used to provide an estimated worldwide wind energy resources distribution. And here, on this global map, the most prominent feature of all is, without doubt, the approximately 500 mile broad seaway, free from freeze-up, that completely encircles the earth at southern latitudes lying between the Antarctic continent and the southernmost coasts of Africa, Australia, and South America. For, throughout the approximately 16,000 mile length of this earth-encircling seaway, completely unobstructed westerly winds flow at speeds whose annual average is as great as can be found anywhere else, worldwide.

Figure 8:
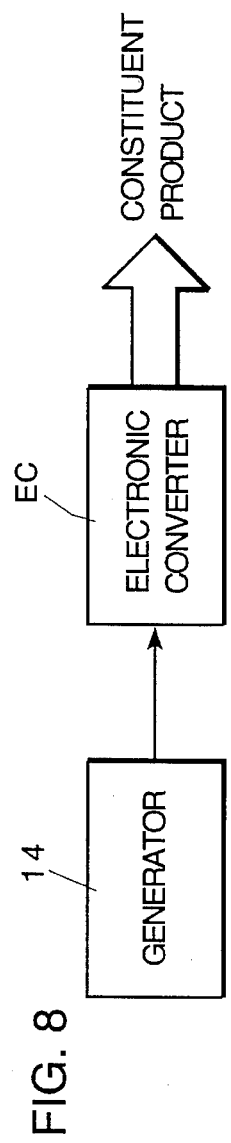
FIG. 8 is a diagram showing the conversion of sea water to its constituent products by electricity generated by the wind-wave converter of the invention.

Throughout this year-round-ice-free seaway, possessing a total area which approaches twice that of the entire Antarctic continent, an unprecedented opportunity is available, immediately, for the utilization of an essentially unlimited number of the aforesaid 500-megawatt sea-based windfarms. Here, however, the appropriate technical approach would be to dedicate each such windfarm exclusively to the production of hydrogen fuel,—through a process involving, in succession, (a) the conversion into electricity of wind, wave, and perhaps other ambient forms of solar or solar-derived renewable energy; (b) the conversion, by electrolysis, of the resulting electric energy into chemical energy, in the forms of hydrogen and oxygen; and (c) the concentration of resulting hydrogen and oxygen from the respective sites of all seagoing wind-wave converters, making up the aforesaid windfarm, to a collocated central hydrogen and oxygen collection facility. FIG. 8 shows the generator 14 of the wind-wave converter system connected to an electrolysis converter C for converting the electrical energy generated by generator 14 into chemical energy in the form of the constituent products of sea water.

As for the transportation and ultimate distribution of each of the windfarm's ultimate end-products hydrogen and oxygen—the following unprecedentedly favorable market niche solution will now become available for the very first time: namely, a solution that will rest upon the fact that each windfarm, instead of being located at a fixed position, will be permitted to drift in its entirety, in a west-to-east direction under the influence of powerful the prevailing westerly winds. In addition, through the use of thrusters located on all component wind-waveconverters, and operating in a computer-coordinated fashion, each windfarm will be able not only to control its own internal spatial configuration, but also to achieve any desired deviation of its actual location away from where it would have ended up in the absence of such thruster action. Moreover, through this computer-coordinating capability, each windfarm will acquire the further capability to move, under its own hydrogen power, in a northerly or southerly direction, to or away from any land-based repository for hydrogen and oxygen that will have already been designated in advance, for the purpose of unloading that windfarm's collection facility whenever such unloading is required.

From the foregoing considerations, it will be seen that any given windfarm could be expected to make one complete circuit around the earth (not including stopovers for unloading hydrogen and oxygen) in several months.

Perhaps what should finally be noted, here, is an aerodynamic property peculiar to vertical-axis wind turbines, in (see e.g., FIG. 3), which renders any VAWT, and, in particular, the presently contemplated component Inverted Eggbeater 101, incapable of starting from standstill without some independent means of first getting it spinning in the wind, and thereby providing it with at least the minimal amount of initial angular momentum necessary for it to reach an equilibrium state of rotational motion determined primarily by the prevailing ambient wind speed.

Surprisingly enough, this ancillary problem of starting from standstill finds a most opportune solution when approached in the context of the transition from a land-based to a sea-based VAWT which has already been proposed at the outset of this specification and has been described in some detail above. For consider once again, in the present light, the additional runner 105 (see FIG. 5) discussed above, whose normally passive function is to be driven by the usually rotating blades 102 (see FIG. 4) of the presently contemplated Inverted Eggbeater 101; and consider, furthermore, the possibility that, conversely, this additional runner 105 might occasionally assume a temporarily active function upon being put into effect to drive the blades 102 of the Inverted Eggbeater 101 in order to start the latter from standstill.

Now this possibility can be tested, in a way that may be easily visualized upon referring to FIGS. 2 and 4, by imagining the water contained in the interior chamber 6 to be allowed entry into a suitable number of additional conduits 111 via an equal number of additional orifices 112 which, like the orifices 22, would be uniformly distributed (see FIG. 5) around the cylindrical wall of chamber 6 in a horizontal plane lying below the water surface 7. Unlike the orifices 22, however, these additional orifices may be visualized as being situated above, rather than below, the aforesaid additional runner 105. Furthermore, each of the additional conduits 111 may be visualized as radiating outwardly and downwardly until it seems one or more of the various conduits 18 (see FIG. 4), into the distal segment(s) of which the aforesaid water may flow, under the automatic control of an interposed valve (not shown), during and only during the process of starting the presently contemplated Inverted Eggbeater 101 from standstill.

During this temporary starting process, the foregoing additional conduits 111 would evidently serve, in much the same way that the various conduits 18 are intended to serve, as elements of a pressure transmission subsystem (see FIG. 4) by means of which extracted wave energy is conveyed from a multiplicity of pumps 46 to the central turbine 12. But, more than this, such extracted wave energy would be directly conveyed, during this temporary starting process, not only to the runner of the central turbine 12, but also to the aforesaid additional runner 105, which would then be in a condition to operate under a temporary working head of water capable of providing the Inverted Eggbeater 101 with enough initial angular momentum to start it from standstill.

Thus, opening the aforesaid interposed valves would make this temporary working head of water immediately available to produce an upward axial flow of water through the additional runner 105; and upon reaching the level of the aforesaid additional orifices 112, this upward flow would be forced to change direction and become divided into a uniformly distributed set of radially outward flows of water, each of which would then traverse, in succession, the following steps (see FIG. 4) in its radially outward progress: first, a corresponding additional conduit 111; next, the distal segment(s) of one or more corresponding conduits 18; and finally, a corresponding set of wave-driven pumps 46.

Now it is here intended that the aforesaid interposed valves should operate in such a manner that, by means of their compound action, they could cause the radially outward flow of water into the distal segments of all conduits 18 to decrease in magnitude wherever it exits from the proximal segments thereof, while simultaneously causing it to increase in magnitude wherever it exits from the additional conduits 111; and vice versa.

In this way, therefore, it would become possible, during, but only during, the temporary starting process, to establish automatic control over the magnitude (in such units as cubic feet per second) of the upward axial flow of water through the additional runner 105; and so it would become possible, again during, but only during, the temporary starting process, to impart to the additional runner 105, and thereby also to the wind energy extracting blades 102 of the Inverted Eggbeater 101, whatever amount of wave-produced rotational kinetic energy might be required to start the latter from standstill.

Accordingly, under the automatic control of the aforesaid interposed valves, the additional runner 105 could be made to perform consecutive combinations of wave energy produced turbine action and wind energy produced pump action such that its rotational speed, and consequently also that of the wind energy extracting blades 102 of the Inverted Eggbeater 101, would gradually build up to that critical point at which the aforesaid wave energy produced turbine action could totally cease, while the aforesaid wind energy produced pump action would continue undiminished in the same rotational sense, in response to the prevailing ambient wind action alone.

Clearly, therefore, throughout the immediately preceding transitional phase of gradual monotonic decrease of the aforesaid wave energy produced turbine action leading up to its total cessation, the aforesaid accompanying wind energy produced pump action must have already undergone a sufficiently great compensating increase; and any such compensating increase will, in turn, have taken place only if the prevailing ambient wind speed had at least a certain corresponding minimum value.

In synchronism with this gradual switching on of the aforesaid wind energy produced pump action (by means of the above mentioned interposed valves), a resulting gradual increase in water pressure will meanwhile have taken place just above the horizontal plane of rotation of the additional runner 105, while, through a similarly synchronized gradual decrease, the water pressure just below this horizontal plane of rotation will finally have been restored to its normal, minimum possible value.

Consequently, by the time the aforesaid wave energy produced turbine action has been totally switched off (again by means of the above mentioned interposed values), the water surface 7 will have risen above its normal level (i.e., the normal operating level as understood in the original context of FIG. 2) by an amount which, in the presence of sufficiently strong wind action, would completely fill the evacuated space at the top of the interior chamber 6 (this space being identifiable in FIG. 2 as the intervening region above the water level 7 and below the dome 8).

Here, the amount by which the water level 7 will actually have risen is determined by the head of water (in feet) that will have already been developed by the aforesaid wind energy produced pump action of the additional runner 105, at that critical point at which the aforesaid wave energy produced turbine action could totally cease.

However, even though at that critical point the prevailing ambient wind speed must necessarily have possessed at least the minimum value referred to above, it can nevertheless happen that particular wind speed could still be too low to force the resulting upward axial flow of water through the additional runner 105 to proceed onward in the form of a radially outward discharge into the entire body of water surrounding the inboard platform 2, in complete analogy with the outward discharge of water produced by the various pumps 46 via the pipes 25 and outlets 42 that are shown schematically in FIG. 2.

Clearly, moreover, some means of egress for any such radially outward discharge must be provided to begin with; and in the present case, as will become evident from a further inspection of FIG. 2, the required means of egress could best be provided by a suitable number of additional outlets 113 which, like the orifices 22, would be uniformly distributed around the cylindrical wall of the interior chamber 6 in a horizontal plane lying below the interior water surface 7. A preferred location for this common horizontal plane would then be just below the normal level of the interior water surface 7 as defined above, and just above the top surface of the buoyant, generally doughnut-shaped exterior vessel 4 portrayed in FIG. 2.

Now the normal level of the interior water surface 7, as represented schematically in FIG. 2, and as defined above, could readily be adapted to lie about 3 or 4 feet, say above the exterior surface 5 of the entire body of water surrounding the inboard platform 2. Correspondingly, the level of the aforesaid common horizontal plane could be located below the exterior water surface 5, but only at such a minimal dept that the aforesaid additional outlets 113 would then be totally, yet only marginally, submerged.

Accordingly, under the immediately foregoing normal conditions of operation, or, indeed, whenever the inboard platform 2 happened to be submerged to a greater depth than that shown in FIG. 2, opening the aforesaid additional outlets 113 would unite into a single, continuous body of water the theretofore confined body of water lying below the interior water surface 7, on the one hand, and the entire unconfined body of water lying below the exterior water surface 5, on the other.

However, unless the excess of exterior over interior water pressure at the level of the aforesaid common horizontal plane could already have been sufficiently reduced, or, preferably, reversed just prior to the opening of the aforesaid additional outlets 113, an enormous inward flow of water would surge through all of those additional outlets 113 immediately upon their being opened. For, at any such level below the exterior water surface 5, the interior water pressure prevailing within the chamber 6 under the immediately foregoing normal conditions of operation would be less, by an amount equivalent to a 30-foot head of water, than the exterior water pressure prevailing within the immediately adjoining portion of the entire body of water surrounding the inboard platform 2.

Indeed, this relatively considerable head of water would simply not exist but for the fact that, solely through the action of the various pumps 46 in producing a virtually everlasting, massive outward discharge of water through the pipes 25 and outlets 42, the interior water surface 7 would have already been brought down to, and permanently maintained at, a level of no more than 3 or 4 feet above that of the exterior water surface 5, provided, of course, that the immediately foregoing normal conditions of operation would be in effect; and provided, furthermore, that the pressure within the evacuated space immediately above the interior water surface 7 would meanwhile have always been kept very nearly equal to zero. The minimum possible pressure within this evacuated space would be water vapor pressure at this prevailing ambient temperature, and thus would be equivalent, on average, to about a 1-foot head of water.

In light of the immediately preceding discussion, it will now be evident that, among those conditions which must be met in order to complete/he herein proposed process of starting the presently contemplated Inverted Eggbeater 101 from standstill the foremost is the requirement that, before the aforesaid additional outlets 113 are under any circumstances allowed to be opened, an opposing head of water, great enough to equilibrate or, preferably, to outweigh the aforementioned 30-foot head of water, must first have already been developed by the wind energy produced pump action of the aforesaid additional runner 105.

As has been indicated on above, this latter requirement would already be met whenever the prevailing ambient wind speed was sufficiently high; and, in this event, the resulting excess of interior over exterior water pressure at the level of the aforesaid common horizontal plane would evidently turn out to be a monotonically increasing function of the prevailing ambient wind speed.

Accordingly, if the aforesaid additional outlets 113 were to be opened automatically in response to any specified amount of such excess water pressure, the corresponding interior and exterior water pressures would immediately undergo simultaneous transient changes toward a final common equilibrium value; and these water pressure changes would be accompanied by a sudden onset of outward flow of water through every additional outlet 113, an outward flow whose finally unvarying magnitude, soon reached under equilibrium conditions, would likewise turn out to be a monotonically increasing function of the prevailing ambient wind speed.

I claim:

1. A method of extracting wind energy throughout a specified layer of the atmosphere overlying and in contact with a large body of water, comprising the steps of:

providing a plurality of independent seagoing wind-waveconverters, each of said wind-waveconverters comprising a wind energy removing means and a wave energy removing means, and each of said wind energy removing means being positioned above, and responsive to wind action, at a different location within said area of the large body of water, positioning each said wave energy removing means generally below the surface of the water so as to provide a stabilized supporting platform for said wind energy removing means, the stabilization of said supporting platform being achieved by:

causing each said wave energy removing means to have a predetermined frequency selective responsiveness to wave induced subsurface water movement, the selective responsiveness of said wave energy removing means being such that, in the presence of practically any prevailing deep water sea state, the combined wave energy extracting operations of all of said wave energy removing means contribute to the overall effect of reducing the ratio of sea height to swell height within said area of the large body of water to a substantially small fraction of the ratio of sea height to swell height simultaneously prevailing in the open-sea approaches to said area of the large body of water, exposing said plurality of independent seagoing wind-waveconverters to combined wind and wave action in said area, converting to a usable form energy extracted in said area of the large body of water.

2. The method of claim 1 wherein said plurality of independent seagoing wind-waveconverters in said bounded area has a windward side in the presence of violent storm sea, including the additional steps of:

deploying substantially on said windward side of said area, a plurality of independent seagoing high power waveconverters, each of said waveconverters comprising a further wave energy removing means, distributing said plurality of waveconverters so as to provide optimum shelter at all times to said plurality of wind-waveconverters from said storm sea, positioning each said waveconverter at such a predetermined depth of submergence below the surface of the water as to achieve at all times the maximum possible rate of correspondingly additional energy removal when subjected to the requirement of maintaining platform stability in the then prevailing ambient storm sea state, said predetermined depth of submergence below the surface of the water being a monotonically increasing function of the violence of said ambient storm sea state in said area of said large body of water, each performing said requirement of maintaining the platform stability of each of said waveconverters, at any such predetermined depth of submergence, by causing a corresponding predetermined frequency selective responsiveness of the further wave energy removing means to wave induced subsurface water movement, so that, at said predetermined depth of submergence, and in the presence of said then prevailing ambient storm sea state, the wave energy extracting operations of said further wave energy removing means reduce the ratio of storm sea height to storm swell height within said area of the large body of water by an amount sufficient to afford to said plurality of wind-waveconverters the required optimum shelter from said violent storm sea, and converting to a usable form additional wave energy extracted by said further wave energy removing means.

3. The method defined in claims 1 or 2 including converting to a usable form wave energy extracted in said area of said large body of water.

4. The method defined in claims 1 or 2 including the step of concentrating converted wind and wave energy in said usable form from the respective sites of said independent seagoing wind-waveconverters and from the respective sites of said high power waveconverters to a central wind and wave energy collection means.

5. A wind energy extraction system for use at sea wherein a plurality of wind energy removing means is deployed above the surface of a selected sea area, and wherein a wave stabilizing means provides shelter from the high seas to said plurality of wind energy removing means sufficient to enable effective wind energy extraction to take place above said selected sea area in the presence of practically any surrounding sea state, said wave stabilizing means comprising:

a corresponding plurality of submersible platforms positioned in said selected sea area for supporting, one-to-one, each wind energy removing means, respectively, and a corresponding plurality of subsurface wave energy removing means supported, one-to-one, by each submersible platform, respectively, the cumulative energy removal of all said subsurface wave energy removing means having the effect of reducing the ratio of sea height to swell height in said selected sea area to a fraction of the ratio of sea height to swell height simultaneously prevailing outside said selected sea area.

6. The wind energy extraction system defined in claim 5 wherein each of said wave stabilizing means includes means to independently and selectively vary the depth of submergence of said plurality of subsurface wave energy removing means while at all times maintaining said plurality of wind energy removing means above the surface of said selected sea area.

7. The wind energy extraction system defined in claim 5 wherein said wave energy removing means includes at least one independent waveconverter positioned on the windward side of said plurality of wind energy removing means.

8. The wind energy extraction system defined in claim 5 wherein said wave energy removing means includes a plurality of independent high power waveconverters, each of which is maneuverable to a coordinatively specifiable position substantially on the windward side of said plurality of wind energy removing means, said plurality of high power waveconverter being deployed so as to provide massive additional shelter from storm sea sufficient to enable effective wind energy extraction to take place above said selected sea area in the presence of any surrounding storm sea state.

9. The wind energy extraction system defined in claim 5 wherein said wind energy removing means is a vertical axis wind turbine (VAWT), and wherein energy extracted by said wave energy removing means is coupled to said wind energy removing means to enhance operation of said wind energy removing means.

10. The wind energy extraction system defined in claim 5 wherein said wind energy extraction system includes one or more liquid passageway and means for causing a flow of liquid in said one or more liquid passageways, and turbine generator means in said one or more liquid passageway and driven by flow of liquid in said one or more liquid passageway to generate electricity.

11. The wind energy extraction system defined in claim 6 wherein said wind energy extraction system includes one or more liquid passageway and means for causing a flow of liquid in said one or more liquid passageways, and turbine generator means in said one or more liquid passageway and driven by flow of liquid in said one or more liquid passageway to generate electricity.

12. The wind energy extraction system defined in claim 11 wherein said wave energy removing means includes means for causing liquid flow in said one or more further liquid passageways.

13. The wind energy extraction system defined in claims 11 or 12 including electrolysis means for converting electricity generated by said turbine generator into chemical energy in the form of at least one of hydrogen and oxygen products.

14. The wind energy extraction system defined in claim 10 wherein said wave energy removing means includes means for causing liquid flow in said one or more further liquid passageways.

15. The wind energy extraction system defined in claim 14 including electrolysis means for converting electricity generated by said turbine generator into chemical energy in the form of constituent products of sea water.

16. A process of extracting wind and wave energy at sea, comprising:

positioning a plurality of independent sea-going wind-waveconverters in an earth encircling seaway, each said wind-waveconverter comprising a wind energy removing means positioned above the water and a wave energy removing means positioned below the surface of the water providing a stabilized supporting platform for said wind energy removing means, converting at least one of the extracted wind and wave energy to electrical energy, converting, by electrolysis, resulting electrical energy into chemical energy in the form of at least one of hydrogen and oxygen products, including maneuvering each said independent sea-going wind-waveconverter in said seaway, providing computer means and utilizing said computer means for controlling the direction of movement of each said wind-waveconverter in said seaway.

17. A process of extracting wind and wave energy at sea, comprising:

positioning a plurality of independent sea-going wind-waveconverters in an earth encircling seaway, each said wind-waveconverter comprising a wind energy removing means positioned above the water and a wave energy removing means positioned below the surface of the water providing a stabilized supporting platform for said wind energy removing means, converting at least one of the extracted wind and wave energy to electrical energy, converting, by electrolysis, resulting electrical energy into chemical energy in the form of at least one of hydrogen and oxygen products, and wherein each said sea-going wind-waveconverter is caused to circumnavigate the earth.

18. The method of claim 1 including selectively varying the depth of submergence of each of said wave energy moving means.

* * * * *